United States Patent [19]

Kuhnen

[11] Patent Number: 5,532,454
[45] Date of Patent: Jul. 2, 1996

[54] METHOD OF JOINING METAL PARTS BY FUSION WELDING

[75] Inventor: Gottfried Kuhnen, Oberrohrdorf, Switzerland

[73] Assignee: Asea Brown Boveri AG, Baden, Switzerland

[21] Appl. No.: 370,786

[22] Filed: Jan. 10, 1995

[30] Foreign Application Priority Data

Jan. 29, 1994 [EP] European Pat. Off. .............. 94101332

[51] Int. Cl.$^6$ .................................................. B23K 9/18
[52] U.S. Cl. .................... 219/137 R; 219/61; 219/73; 219/125.11
[58] Field of Search ........................... 219/137 R, 125.1, 219/125.11, 61, 73, 73.2, 76.1

[56] References Cited

U.S. PATENT DOCUMENTS

| | | | |
|---|---|---|---|
| 3,137,782 | 6/1964 | Rieppel et al. | 219/61 |
| 4,208,003 | 6/1980 | Meylan | 219/76.1 |
| 4,213,025 | 7/1980 | Kuhnen | 219/73.2 |
| 4,219,717 | 8/1980 | Kuhnen | 219/137 R |
| 4,962,586 | 10/1990 | Clark et al. | 29/889.2 |

FOREIGN PATENT DOCUMENTS

2633829C2  3/1984  Germany.

Primary Examiner—Clifford C. Shaw
Attorney, Agent, or Firm—Burns, Doane, Swecker & Mathis

[57] ABSTRACT

A method of joining metal parts by fusion arc welding in a weld of small volume includes the steps of providing the metal parts to be joined having a first side which accessible to a welding operation and a second side opposite the first side. The metal parts have welding surfaces shaped to have a first flank adjacent the first side and a second flank adjacent the second side, a step joining the flanks. Each part has a relief bulge formed in the second side adjacent the second flank, and a centering offset at the second flank to position the metal parts relative to one another for welding. The relief bulge is provided to ensure that the centering offsets melt during welding, and is shaped to have a sufficient size so that a predetermined melt-through point develops for melting of the centering offset during welding. The metal parts are positioned for welding by abutting the second flanks at the centering offset, the parts being positioned so that the first flanks define therebetween a first gap and the second flanks define therebetween a second gap, the second gap being narrower than the first gap. In a first welding step, the metal parts are joined at the second flanks by one of a fully automatic tungsten inert-gas welding process (GTAW) or gas metal-arc welding process (GMAW) to form multi-pass welding beads which extend over the entire width of the second gap, and thereafter, the first flanks are joined with a submerged-arc welding process by forming a plurality of welding beads bearing alternately against one and an opposite flank.

9 Claims, 1 Drawing Sheet

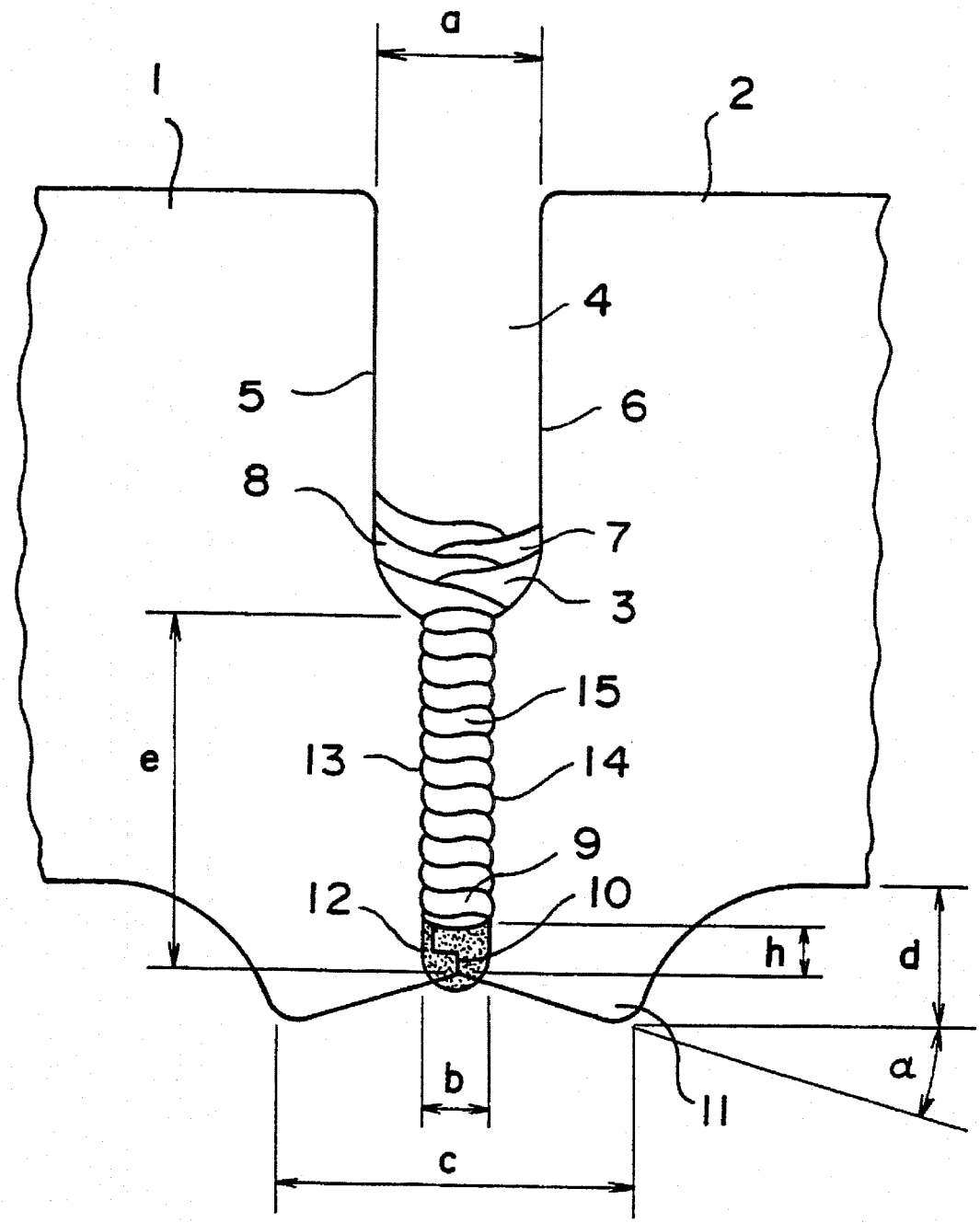

METHOD OF JOINING METAL PARTS BY FUSION WELDING

BACKGROUND OF THE INVENTION

1. Field of the Invention

The invention relates to a method of joining metal parts by means of fusion arc welding by a weld of small volume (narrow-gap welding).

2. Discussion of Background

U.S. Pat. No. 4,219,717 to Kuhnen discloses a method of joining metal parts by means of fusion arc welding by a weld of small volume. Here, the workpiece parts to be joined and forming a narrow gap are first of all welded with or without filler metal at their joint groove by a base weld produced by means of electron-beam, plasma-arc, laser-beam or argon-arc welding processes. The workpiece flanks formed by the narrow gap are then joined by the submerged-arc welding process by a welding bead bearing alternately against the one and the other flank, by each welding bead of the submerged-arc welding being placed in such a way that it overlaps the underlying welding bead in the central third of the narrow gap and in each case fuses only one workpiece flank, that the width of the narrow gap is equal to four times the diameter of the welding wire used and the current density in the welding wire during the submerged-arc welding is 50 A/mm$^2$, and that the welding speed is proportioned in such a way that the energy per unit length is 8.5 kJ/cm at a wire diameter of 2.5 mm, 12.5 kJ/cm at a wire diameter of 3 mm and 22 kJ/cm at a wire diameter of 4.0 mm.

The method can be applied especially effectively to the joining of rotationally symmetric bodies in heavy machine construction. Thick-walled components which are accessible only from one side and therefore cannot be rewelded on the root side can also be effectively joined with the method according to U.S. Pat. No. 4,219,717 to Kunen. A preferred field of application of the method is the joining of disc-shaped and hollow-cylindrical forgings which are used for the construction of rotors for steam and gas turbines, compressors and also turbo-generators.

The advantage of this method consists in the fact that an inclusion-free, fine-grained structure develops at the joint between the workpiece parts. There is no longer a primary structure in either the weld deposit or the heat-affected zone. Subsequent normalizing or quenching and tempering are consequently unnecessary.

But on the other hand the method has the disadvantage that it can only be used semi-automatically. In addition, the base weld has to be made vertically in the root area and have a certain depth so that, for example, the welded rotor does not buckle when it is then finish-welded horizontally by means of submerged-arc narrow-gap welding.

SUMMARY OF THE INVENTION

Accordingly, one object of the invention is to provide a novel method of achieving higher efficiency compared with the prior art as a result of fully automatic welding in a welding process for producing welds of small volume of the highest quality, with which welding process complicated and voluminous workpieces and in particular workpieces which are accessible only on one side for the welding process can also be joined.

According method of the invention this is achieved by virtue of the fact that the metal parts to be joined, apart from the narrow gap, also have an extremely narrow gap and a centering offset and are first of all positioned relative to one another by the centering offset, a relief bulge is formed in the weld-bottom area in such a way that a predetermined melt-through point develops during the welding, and wherein, before the submerged-arc narrow-gap welding process, the workpiece flanks formed by the extremely narrow gap are joined by means of fully automatic tungsten inert-gas welding process (GTAW) or gas metal-arc welding process (GMAW) by multi-pass welding beads which in each case extend over the entire width of the extremely narrow gap. The workpiece flanks formed by the narrow gap are then joined together in a known manner by means of the submerged-arc welding process.

The advantages of the invention are to be seen, inter alia, in the fact that the extremely narrow gap can be automatically welded and therefore a high efficiency of the method is achieved. Welds of the highest quality are produced so that a subsequent heat treatment of the joined workpieces is not necessary. In particular, individual parts which are only accessible from one side for the welding process can be joined together.

It is especially convenient when a relief bulge is used having a width which is about three times its height. This ensures that undercutting developing during the welding develops on both sides of the melt-through bead and thus only outside the bearing cross-section.

Furthermore, it is advantageous when an extremely narrow gap is used, the height of which is six to ten times its width, but is at least 40 mm. Since the heat input continues to increase with increasing weld height, it is only possible at these dimensions to also weld the last welding bead in only one pass, so that full automation is made possible.

Finally, during the GTAW or GMAW welding process, a welding wire is advantageously used, the diameter of which is one-fifth to one-quarter of the width of the extremely narrow gap, but is at least 0.8 mm and at most 1.6 mm. Reliable wire guidance and a good welding result are thereby achieved.

In addition, during the GTAW or GMAW welding process, work is advantageously carried out as a function of the preheating temperature, which is preferably above 200°C., with current intensities in the range of 200 to 300 A at a feed of 50 to 200 mm per minute.

Finally, it is of advantage when argon or argon with a maximum of 8% hydrogen or an argon/helium mixture having 30 to 70% argon, preferably 50% argon, and the remainder helium is used as inert gas. Welds of excellent quality can thus be produced.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, wherein:

An exemplary embodiment of the invention is shown. The single figure shows a schematic cross-section through the workpiece parts to be joined in the area of the weld. Only the elements essential for understanding the invention are shown.

DESCRIPTION OF THE PREFERRED EMBODIMENTS

Referring now to the drawing, wherein like reference numerals designate identical or corresponding parts throughout the several views, in the figure the cross-section through the workpiece parts to be joined in the area of the weld is schematically shown. The metal parts to be joined are designated by 1 and 2, and their opposite parallel workpiece flanks are designated by 5 and 6 at the narrow gap 4 and by 13 and 14 at the extremely narrow gap 9. On the side inaccessible to the welding (for example the inside of hollow bodies), the metal parts 1, 2 to be joined butt against one another at a centering offset 10 and are positioned relative to one another. A relief bulge 11 is formed in the weld-bottom area in such a way that a predetermined melt-through point 12 develops during the welding, so that melting of the centering offset 10 is forcibly achieved during the welding. Undercutting then only occurs on both sides of the melt-through bead, whereas the bearing cross-section has no undercutting, which has a very favorable effect on the stress behavior of the material.

In this exemplary embodiment, the centering offset 10 has a height h of 5 mm, the relief bulge 11 a width c of 40 mm overall and a height d of 15 mm. The angle α formed between the horizontal and the relief bulge is 15°. On account of these geometric dimensions, the melting of the centering offset 10 is achieved with closely toleranced welding-data ranges.

The parallel workpiece flanks 13, 14 at the extremely narrow gap 9 having a width b of, in this exemplary embodiment, 5 mm and a height e of about 40 mm are joined by fully automatic GTAW welding. In the process, the welding beads 15 extend from one workpiece flank 13 to the opposite workpiece flank 14 and therefore in each case fuse both workpiece flanks. Once the arc has been positioned, no change is necessary, so that the welding operation can proceed automatically. During this GTAW welding, a welding wire having a diameter of 1.2 mm is used. As a function of the preheating temperature, work is carried out with current intensities in the range of 200 to 300 A at a feed of 50 to 200 mm per minute. Argon is used as inert gas. A mixture of argon and a maximum of 8% hydrogen or a mixture of argon and 30 to 70% helium can of course also be used in other exemplary embodiments, optimum results being achieved when using the same proportions of argon and helium. Welds of excellent quality are produced with the GTAW welding.

On the other hand, if the GMAW process is used in another exemplary embodiment for welding the extremely narrow gap 9, certain contamination of welding-wire feed tube, inert-gas nozzle and workpiece flanks of the welding grooves as well as slag coatings on the welding-bead surface have to be expected on account of the known spatter of metal particles in the arc/inert-gas/molten-pool space, so that the quality of the weld in the extremely narrow gap 9 is not as excellent as in the GTAW process on account of a possible lack of fusion.

After this "base weld" is made, the narrow gap 4 formed by the workpiece flanks 5 and 6 and having the width a of <16 mm is closed in the manner disclosed in U.S. Pat. No. 4,219,717 to Kohnen by the submerged-arc welding process in such a way that welding beads 7 and welding beads 8 are alternately placed against the workpiece flank 6 and the workpiece flank 5 respectively. These welding beads 7 and 8 in each case overlap in the central third of the narrow gap 4. The respective axial position of the welding wire ensures that at the same time only one each of the workpiece flanks 5 or 6 is fused during the welding operation. An advantageous structure is thereby achieved, the composition of the molten metal is kept constant over the entire weld cross section, and the stresses vary within tolerable limits during cooling.

Under actual welding conditions, the weld width at the extremely narrow gap 9 becomes larger with an increase in the number of welding beads 15 of the GTAW or GMAW welding process. This is caused by the low deposition efficiency of the GTAW or GMAW process and the ever increasing heat input. This means that the extremely narrow gap 9 may only have a certain maximum height e, since otherwise the bridging of the extremely narrow gap 9 can no longer be achieved with only one weld pass. An automatic welding process would thus no longer be possible.

The method according to the invention can be applied to both rotationally symmetric bodies and other thick-walled metal parts, in particular to such which are only accessible from one side and cannot be rewelded on the root side, for example, plates, pipes, discs and hollow cylinders of low- or high-alloy metallic materials.

A preferred field of application is the fabrication of rotors of energy-converting machines, which are composed of individual rotary bodies having hollow spaces or turned recesses at the end face, for example of disc-shaped or hollow cylindrical forgings of the same strength or the same thickness. These forgings are first of all vertically joined in the "root area", i.e. in the area of the extremely narrow gap 9, by means of the GTAW or GMAW welding process described above. Then the rotor is finish-welded horizontally in the area of the narrow gap 4 by means of submerged-arc welding. So that the rotor does not buckle in the process, the first weld must have a certain depth, that is, the extremely narrow gap 9 must have a certain height e. According to the invention, the height e of the extremely narrow gap 9 is here in the region of 6 to 10 times its width b and is at least 40 mm.

The GTAW welding process at the extremely narrow gap 9 is especially suitable for joining metal parts of Ni-based alloys, since only very small heat-affected zones arise during this welding process and these materials are in particular extremely susceptible to defects in the heat-affected zone. In this way, excellent welding quality can be achieved.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of joining metal parts by fusion arc welding in a weld of small volume, comprising the steps of:

providing metal parts to be joined having a first side to be accessible to a welding operation and a second side opposite the first side, the parts having welding surfaces shaped so that each surface has a first flank adjacent the first side and a second flank adjacent the second side, the flanks joined by a step, and each part having a relief bulge formed in said second side adjacent said second flank, and a centering offset at said second flank to position the metal parts, wherein each relief bulge is of sufficient size so that a predetermined melt-through point develops for melting of the centering offset during welding;

positioning the metal parts for welding by abutting the second flanks at the centering offset, the parts being positioned so that the first flanks define therebetween a first gap and the second flanks define therebetween a second gap, the second gap being narrower than the first gap;

joining the metal parts at the second flanks by one of a fully automatic tungsten inert-gas welding process (GTAW) or gas metal-arc welding process (GMAW) to form multi-pass welding beads which extend over the entire width of the second gap; and, joining the metal parts at the first flanks with a submerged-arc welding process by forming a plurality of welding beads bearing alternately against one and an opposite flank.

2. The method as claimed in claim 1, wherein said relief bulge has a width which is about three times a height of the relief bulge.

3. The method as claimed in claim 1, wherein said second gap has a height which is in a range of six to ten times a width of the second gap, but is at least 40 mm.

4. The method as claimed in claim 1, wherein, during the GTAW or GMAW welding process, a welding wire is used having a diameter of one-fifth to one-quarter of the width of the extremely narrow second gap.

5. The method as claimed in claim 4, wherein the welding wire has a diameter in a range of 0.8 mm to 1.6 mm.

6. The method as claimed in claim 1, wherein, the GTAW or GMAW welding process is carried out as a function of a preheating temperature with current intensities in a range of 200 to 300 A at a feed rate of 50 to 200 mm per minute.

7. The method as claimed in claim 6, wherein the welding process is carried out as a function of a proportion of alloying elements with preheating temperatures above 200° C.

8. The method as claimed in claim 1, comprising the step of providing an inert gas of one of argon, argon with a maximum of 8% hydrogen, and an argon/helium mixture having 30% to 70% argon and the remainder helium.

9. The method as claimed in claim 8, wherein said inert gas is an argon/helium mixture having 50% argon and 50% helium.

* * * * *